United States Patent
Tao

(10) Patent No.: US 11,553,694 B2
(45) Date of Patent: Jan. 17, 2023

(54) DOG LEASH

(71) Applicant: Ningbo Yinzhou Yuanqian Commodity Co., Ltd., Ningbo (CN)

(72) Inventor: Yunwei Tao, Ningbo (CN)

(73) Assignee: Ningbo Yinzhou Yuanqian Commodity Co., Ltd., Ningbo (CN)

( * ) Notice: Subject to any disclaimer, the term of this patent is extended or adjusted under 35 U.S.C. 154(b) by 146 days.

(21) Appl. No.: 17/078,956

(22) Filed: Oct. 23, 2020

(65) Prior Publication Data
US 2022/0125016 A1    Apr. 28, 2022

(51) Int. Cl.
*A01K 27/00* (2006.01)

(52) U.S. Cl.
CPC .......... *A01K 27/003* (2013.01); *A01K 27/005* (2013.01)

(58) Field of Classification Search
CPC .... A01K 27/005; A01K 27/00; A01K 27/003; F16G 11/14; F16G 11/106; F16G 11/048; F16G 11/00
See application file for complete search history.

(56) References Cited

U.S. PATENT DOCUMENTS

| | | | | |
|---|---|---|---|---|
| 4,974,549 A | * | 12/1990 | Gordon | F16G 11/06 24/135 R |
| 5,310,274 A | * | 5/1994 | Arakawa | F16G 11/02 403/309 |
| 6,438,802 B1 | * | 8/2002 | Beeman | A01K 27/003 24/135 R |
| 6,460,488 B1 | * | 10/2002 | Manzella | F16G 11/048 119/769 |
| 9,374,984 B2 | | 6/2016 | McCay | |
| 9,398,758 B2 | | 7/2016 | Cooligan-Knoefel | |
| 9,485,965 B2 | * | 11/2016 | Bentley | A01K 27/002 |
| 10,085,424 B2 | | 10/2018 | Cromwell et al. | |
| 10,420,362 B2 | | 9/2019 | Rand | |
| 2021/0127639 A1 | * | 5/2021 | Calandro | A01K 27/005 |
| 2022/0095588 A1 | * | 3/2022 | Neal | A01K 27/005 |

* cited by examiner

*Primary Examiner* — Kristen C Hayes
(74) *Attorney, Agent, or Firm* — Craft Chu PLLC; Andrew W. Chu

(57) ABSTRACT

The dog leash includes a dog leash body. An end of the dog leash body is provided with an annulus structure and forms a traction part. The traction part is provided with a buckle by butt-and-collar joint. The root segment of the traction part is covered with a sheath. The dog leash adapts flexible steel wire rope with good flexibility and high strength. The steel wire rope is coated with plastic layer, which has good touch feeling and high use comfort.

7 Claims, 6 Drawing Sheets

DOG LEASH

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to rope, and specifically to a dog leash.

2. Description of Related Art Including Information Disclosed Under 37 CFR 1.97 and 37 CFR 1.98

There are more and more people keeping dogs as pets in cities. Pet dogs are cute and are loved by dog lovers. In urban areas, situations of people walking and traveling with pet dogs are frequently seen. Bad behaviors of dogs are often controlled by using traction ropes. Among many bad behaviors, dog's violent and pulling behaviors are most disturbing to the owner. The ends of the traditional dog leashes have little grasping strength, and it is easy to slip out of the owner' hands when the dog is pulled. In order to improve the grasping strength, an end of the dog leash is usually wrapped around the wrist to increase the grasping strength. However, the winding will cause inconvenience to the hand, and it is easy to cause injury to the hand when the dog pulls.

In case that people needs to leave when walking a dog, the dog leash is usually tied somewhere, which is inconvenient to operate and easy to loosen.

BRIEF SUMMARY OF THE INVENTION

The Problem Sought to be Solved by the Invention

The problem sought to be solved by the invention is to provide a dog leash that has high structural strength, good touch feeling and is easy to grasp and bind.

The Technical Solution Applied by the Invention to Solve Such Technical Problem The present invention provides a dog leash comprising a dog leash body 2; an end of said dog leash body 2 is provided with an annulus structure 23 and forms a traction part; said traction part is provided with a buckle 3 by butt-and-collar joint; the root segment of said traction part is covered with the sheath 1.

Further, the ends of the dog leash body 2 are bent and touched with sidewall of the dog leash body 2 and are pressed and fixed by a steel ring 22; and said steel ring 22 is located within said sheath.

Further, a main leash body 211 is arranged at the side of the front end of said steel ring 22; a second leash body 231 and a third leash body 232 that are connected with each other are arranged at the side of the rear end of said steel ring; the front end of said sheath is provided with a first leash opening 111 for said main leash body 211 to pass through; the rear end is provided with a second leash opening 115 for said second leash body 231 to pass through and a third leash opening 114 for said third leash body 232 to pass through.

Further, a position fixing part for prevent the steel ring 22 from slipping is provided inside said sheath.

Further, the front end of said sheath is tapered.

Further, the rear end of said sheath is an arc surface.

Further, said sheath comprises a first shell 21 and a second shell 22 engaged with each other; the edge of said first shell 21 is provided with a bulge and forms a first connecting part 116; the edge of said second shell is provided with a groove for the snap-in of said bulge and forms a second connecting part 121.

Further, said first shell is provided with a first positioning pin 113 and a second positioning pin 112; said first positioning pin is located between said second leash opening and said third leash opening; said second positioning pin is eccentrically set; a steel ring accommodation cavity for the steel ring to be inserted in is formed between said first positioning pin and said second positioning pin; said second shell is provided with a first positioning hole 123 for said first positioning pin to be inserted in and a second positioning hole 122 for said second positioning pin to be inserted in.

Advantageous Effects

The dog leash of the present invention adopts flexible steel wire rope with good flexibility and high strength; the steel wire rope is coated with plastic layer, which has good touch feeling and high use comfort; the end of the leash is provided with an annular traction part, which is convenient to grasp and strong in strength, so as to avoid the dog from escaping when pulling; the traction part is provided with a spring buckle, which is convenient and reliable for fixing; the root segment of the traction part is provided with a sheath, thus improving the use comfort and touch feeling, and avoiding the steel ring at the root segment of the traction part from scratching hands, so that it has high safety and beautiful appearance; the position fixing part is arranged in the sheath, which is compact in structure, and can prevent the steel ring or the sheath from swaying; the sheath adopts double-shell assembly structure, which has low production cost and can be assembled conveniently and quickly. The dog leash of the present invention has a compact structure, high strength, high degree of use comfort and good safety.

DETAILED DESCRIPTION OF THE INVENTION

In the following, embodiments of the invention will be explained in details with reference to the accompanying drawings.

Figure 1:
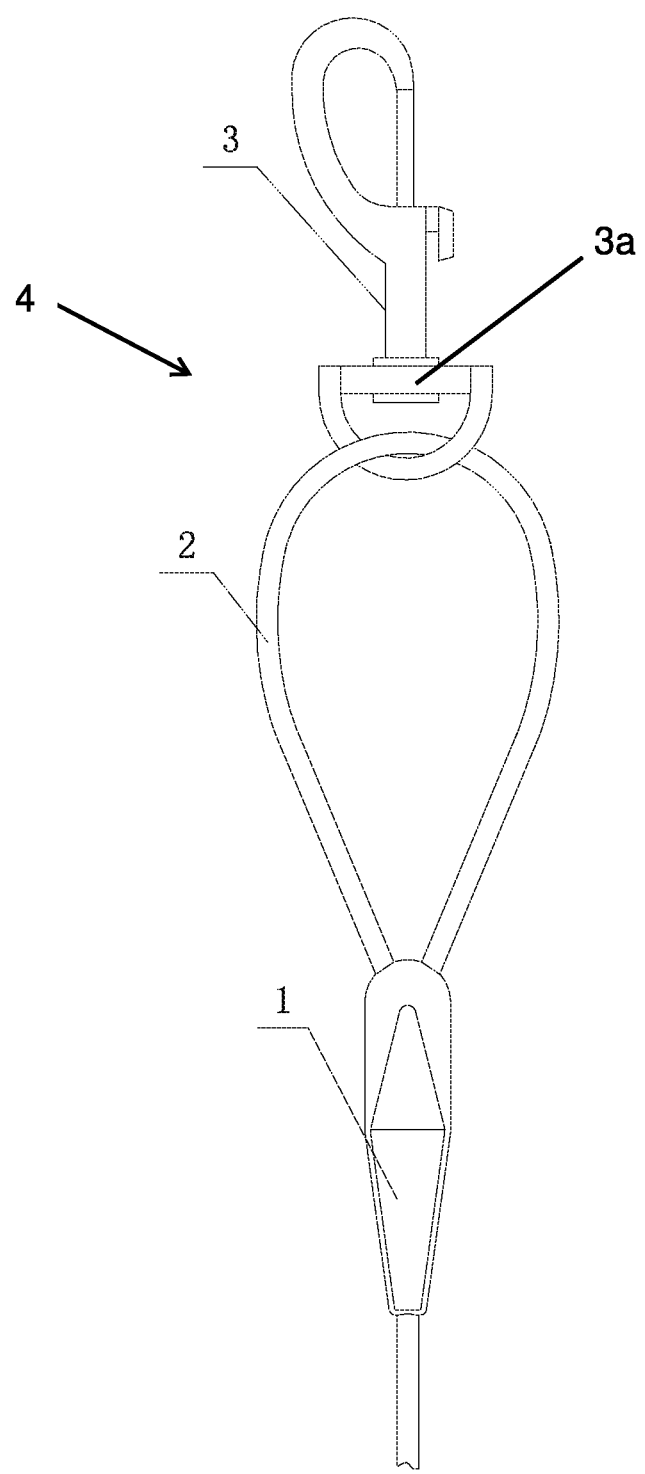
FIG. 1 is a structural diagram of the dog leash of the present invention.
Figure 2:
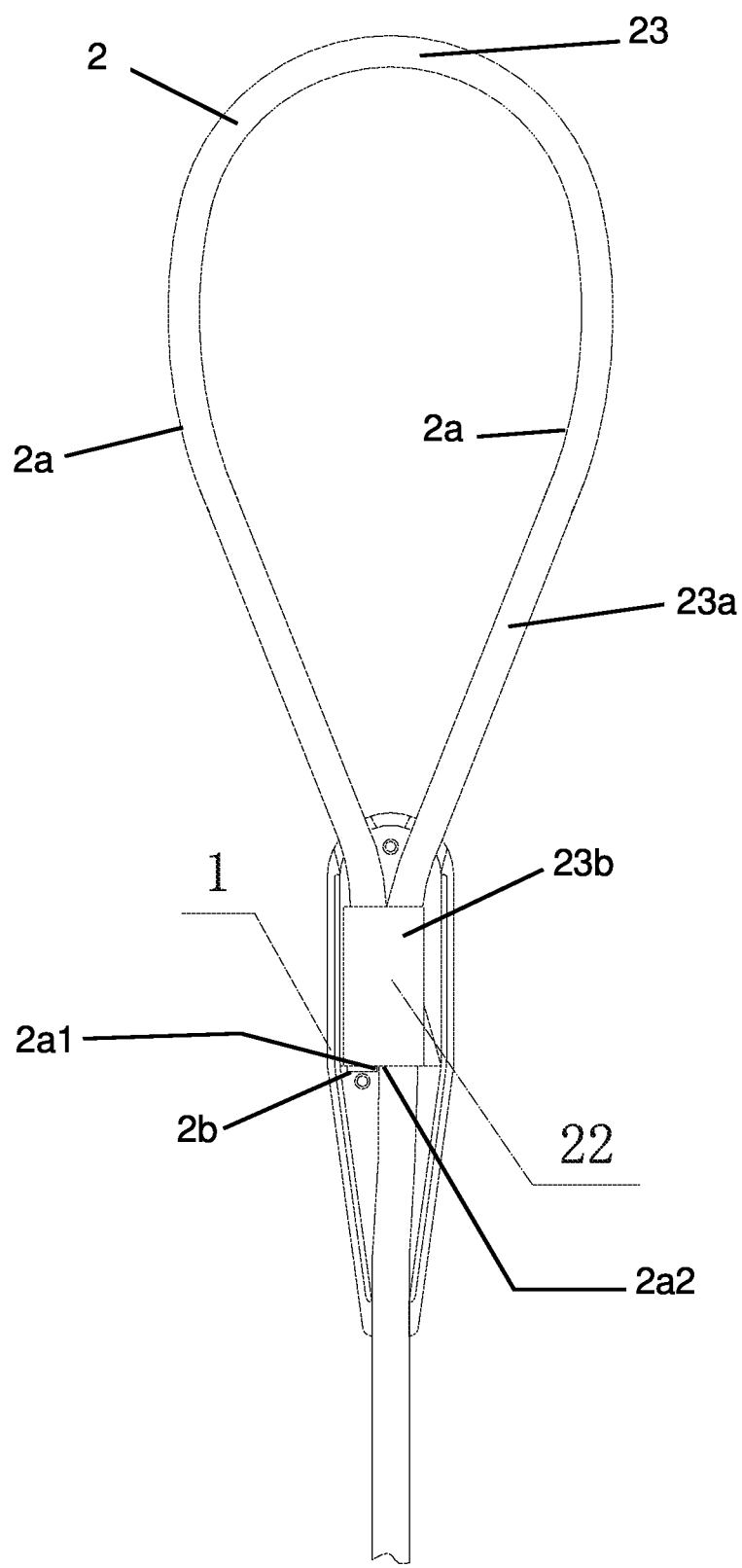
FIG. 2 is an internal structure diagram of the dog leash of the present invention.
Figure 3:
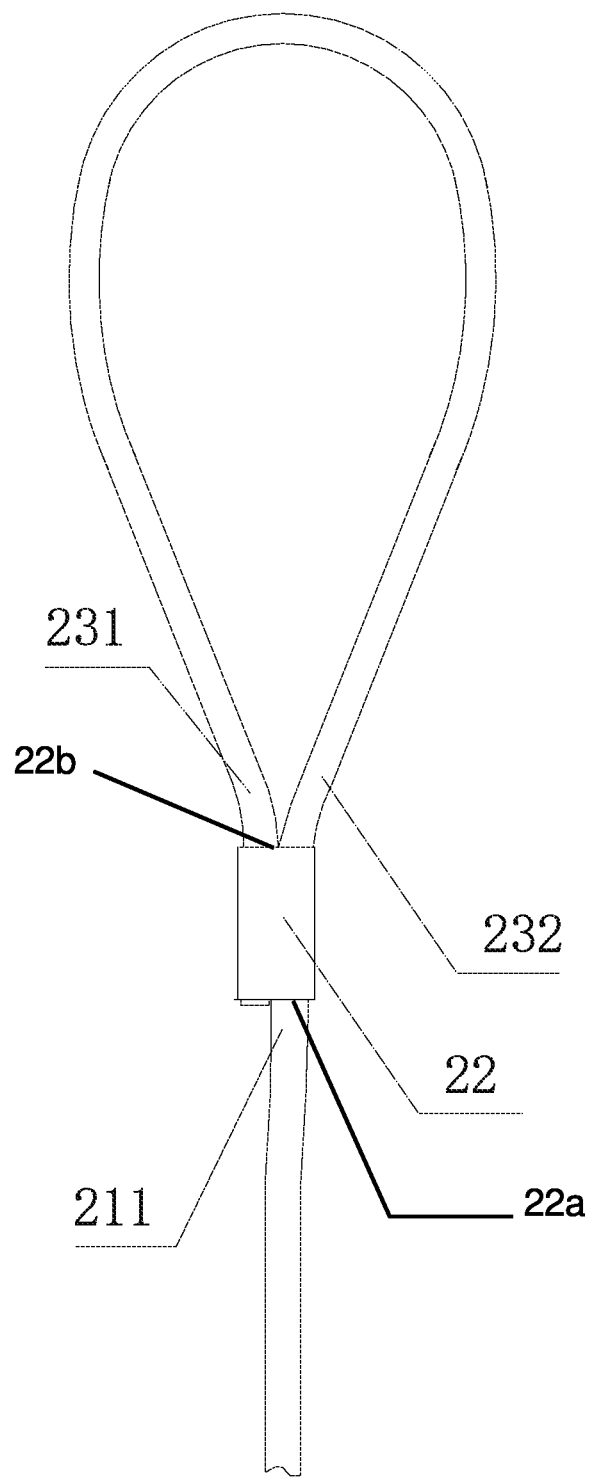
FIG. 3 is a structural diagram of the dog leash body of the dog leash of the present invention.
Figure 4:
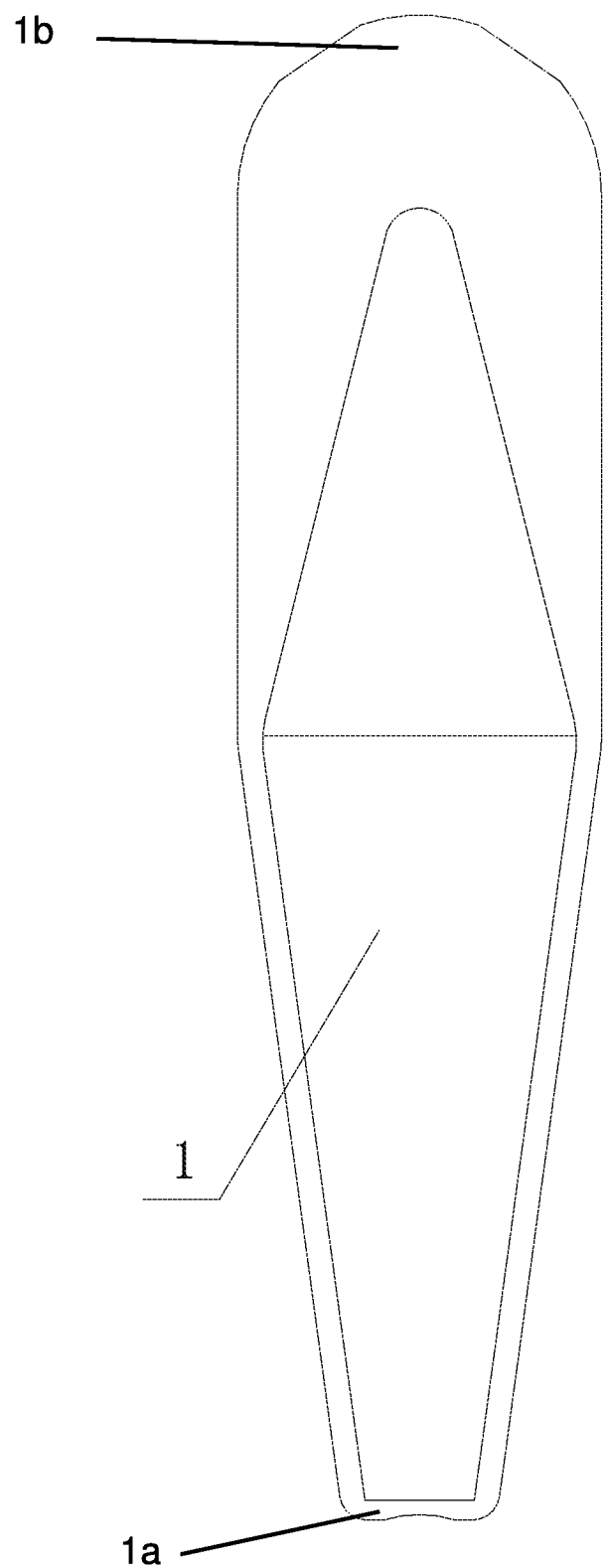
FIG. 4 is a structural diagram of the sheath of the dog leash of the present invention.
Figure 5:
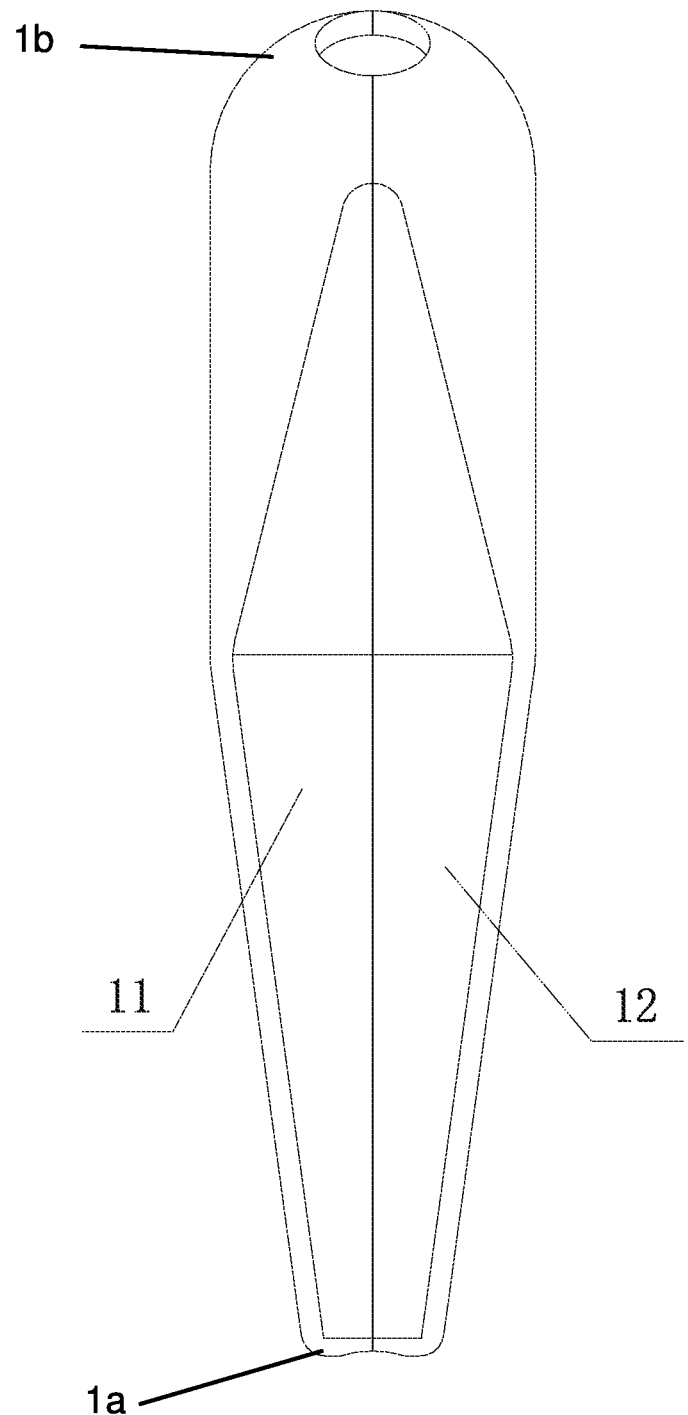
FIG. 5 is an another schematic diagram of angle structure of the sheath of the dog leash of the present invention.
Figure 7:
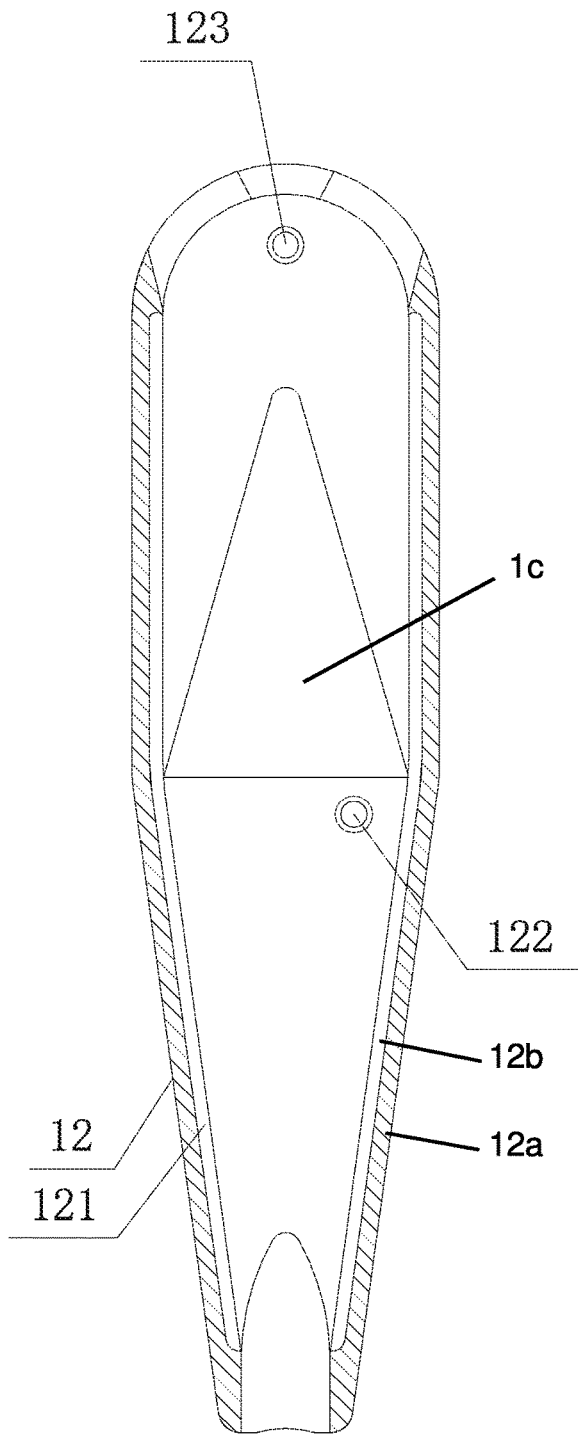
FIG. 7 is a structural diagram of the second shell of the dog leash of the present invention.
Figure 6:
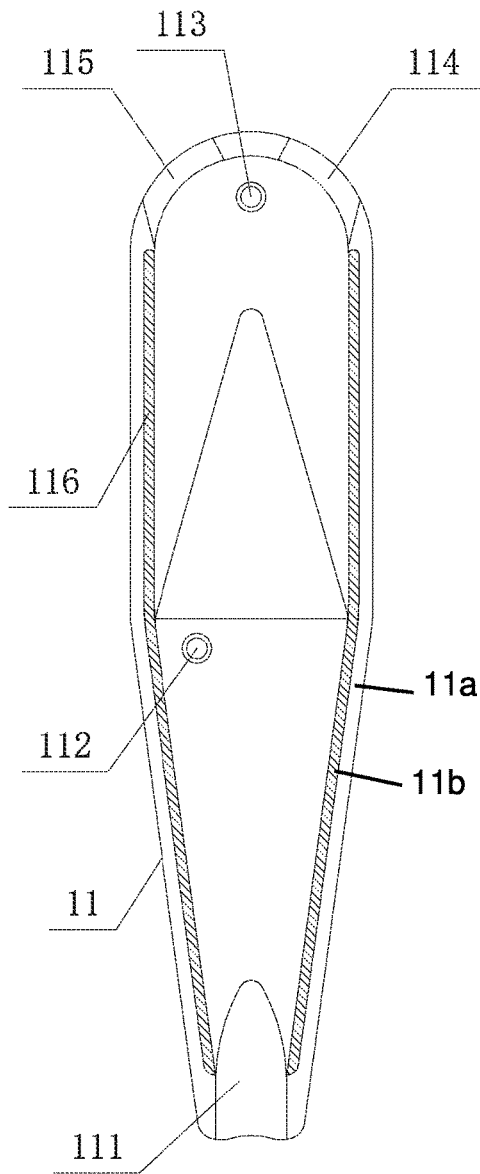
FIG. 6 is a structural diagram of the first shell of the dog leash of the present invention.

Referring to FIG. 1 to FIG. 7, the present invention provides a dog leash 4 comprising a dog leash body 2. The dog leash body 2 comprises a flexible steel wire rope (stainless steel wire rope), and a plastic layer is coated outside the steel wire rope. The end (traction end 2b) of the dog leash body 2 is bent to form an annulus structure 23 from a traction part 23a. The traction part is provided with a buckle 3 by butt-and-collar joint 3a. For the convenience of use, the buckle is a universal hook rotating spring buckle. The root segment 23b of the traction part is covered with a sheath 1. The sheath may be made of plastic.

Specifically, the ends of the dog leash body 2 are bent and touched with sidewalls (side walls 2a, side wall portion 2a1 and another side wall portion 2a2) of the dog leash body 2, and are pressed and fixed by a steel ring 22. Exposure of the steel ring will cause poor touch feeling and is easy to cut hands when pulling; thus, the steel ring 22 is located within the sheath, which can improve the use comfort and safety, and avoid the root segment of the traction part from scratching hands. A main leash body portion 211 is arranged at the side of the front end (front steel ring end 22a) of the steel ring 22; a second leash body portion 231 and a third leash body portion 232 that are connected with each other are arranged at the side of the rear end (rear steel ring end 22b) of the steel ring. The first or main leash body portion 211, the second leash body portion 231 and the third leash body portion 232 together form a Y-shape, and the steel ring is located at the joint of these three elements. The front end (front sheath end 1a) of the sheath is provided with a first leash opening 111 for the main leash body portion 211 to pass through; the rear end (rear sheath end 1b) is provided with a second leash opening 115 for the second leash body 231 portion to pass through and a third leash opening 114 for the third leash body portion 232 to pass through. The diameter of leash openings is same with that of the leash bodies, and the sheath is wholly touched tightly with the steel ring and the dog leash body, thus enabling a small size and good touch feeling. In an embodiment, the front end of the sheath is tapered, the cross section of the middle portion (other than the steel ring) is rectangular, and the rear end is an arc surface, preferably a hemispherical surface; and the appearance is beautiful and compact. In order to improve the compactness of the structure and avoid the shaking of the sheath, a position fixing part for prevent the steel ring 22 from slipping is provided inside the sheath.

The sheath comprises a first shell 11 and a second shell 12 that are engaged with each other. The edge (first shell edge 11a) of the first shell 11 is provided with a bulge 11b and forms a first connecting part 116, and the edge (second shell edge 12a) of the second shell 12 is provided with a groove 12b for the snap-in of the bulge and forms a second connecting part 121. Snap-fit of the first shell and the second shell forms a cladding chamber for accommodating the root segment of the traction part. The first shell is provided with a first positioning pin 113 and a second positioning pin 112, both of which face the opening direction of the first shell, i.e. facing the second shell. The first positioning pin is located between the second leash opening and the third leash opening, and the second positioning pin is eccentrically set, i.e. does not lie on the axis of the first shell, which can avoid affecting the installation of the first leash body. A steel ring accommodation cavity 1c for the steel ring to be inserted in is formed between said first positioning pin and said second positioning pin; the first positioning pin and the second positioning pin forms the position fixing part that is used to restrict the axial slip of the steel ring. The second shell is provided with a first positioning hole 123 for said first positioning pin to be inserted in and a second positioning hole 122 for said second positioning pin to be inserted in.

The dog leash of the present invention has the same structure at both terminals.

The dog leash of the present invention adopts flexible steel wire rope with good flexibility and high strength; the steel wire rope is coated with plastic layer, which has good touch feeling and high use comfort; the end of the leash is provided with an annular traction part, which is convenient to grasp and strong in strength, so as to avoid the dog from escaping when pulling; the traction part is provided with a spring buckle, which is convenient and reliable for fixing; the root segment of the traction part is provided with a sheath, thus improving the use comfort and touch feeling, and avoiding the steel ring at the root segment of the traction part from scratching hands, so that it has high safety and beautiful appearance; the position fixing part is arranged in the sheath, which is compact in structure, and can prevent the steel ring or the sheath from swaying; the sheath adopts double-shell assembly structure, which has low production cost and can be assembled conveniently and quickly. The dog leash of the present invention has a compact structure, high strength, high degree of use comfort and good safety.

Above descriptions are only some preferred embodiments of the present invention, and it should be pointed out that, as for a person skilled in the art, modifications and alternatives can be made without departing from the discipline of the present invention, and such modifications and alternative also fall within the scope of the present invention.

I claim:

1. A dog leash, comprising:
   a dog leash body having side walls and a traction end so as to form a traction portion with an annulus structure and a root segment,
   wherein said traction portion is comprised of a side wall portion corresponding to said traction end and another side wall portion of said traction portion distal from said traction end;
   a buckle being comprised of a butt-and-collar joint and being attached to said traction portion;
   a sheath covering said root segment and having a front sheath end and a rear sheath end opposite said front sheath end; and
   a steel ring within said sheath, said steel ring having a front steel ring end and a rear steel ring end opposite said front steel ring end,
   wherein said side wall portion and said another side wall portion are bent so as to touch within said steel ring, said side wall portion and said another side wall portion being pressed and fixed by said steel ring.

2. The dog leash, according to claim 1,
wherein said dog leash body forms a main leash body portion arranged at said front steel ring end, a second leash body portion arranged at said rear steel ring end, and a third leash body portion connected to said second leash body portion and arranged at said rear steel ring end,
wherein said front sheath end is comprised of a first leash opening, said main leash body portion passing through said first leash opening, and
wherein said rear sheath end is comprised of a second leash opening and a third leash opening, said second leash body portion passing through said second leash opening, said third leash body portion passing through said third leash opening.

3. The dog leash, according to claim 1, further comprising:
a position fixing means within said sheath so as to prevent said steel ring from slipping inside said sheath.

4. The dog leash, according to claim 1, wherein said front sheath end is tapered.

5. The dog leash, according to claim 1, wherein said rear sheath end is comprised of an arc surface.

6. A dog leash, comprising:
a dog leash body having side walls and a traction end so as to form a traction portion with an annulus structure and a root segment,
wherein said traction portion is comprised of a side wall portion corresponding to said traction end and another side wall portion of said traction portion distal from said traction end;
a buckle being comprised of a butt-and-collar joint and being attached to said traction portion;
a sheath covering said root segment and having a front sheath end and a rear sheath end opposite said front sheath end; and
a steel ring within said sheath, said steel ring having a front steel ring end and a rear steel ring end opposite said front steel ring end,
wherein said side wall portion and said another side wall portion are bent so as to touch within said steel ring, said side wall portion and said another side wall portion being pressed and fixed by said steel ring,
wherein said dog leash body forms a main leash body portion arranged at said front steel ring end, a second leash body portion arranged at said rear steel ring end, and a third leash body portion connected to said second leash body portion and arranged at said rear steel ring end,
wherein said front sheath end is comprised of a first leash opening, said main leash body portion passing through said first leash opening,
wherein said rear sheath end is comprised of a second leash opening and a third leash opening, said second leash body portion passing through said second leash opening, said third leash body portion passing through said third leash opening, and
wherein said sheath comprises:
a first shell having a first shell edge with a bulge so as to form a first connecting part, and
a second shell having a second shell edge with a groove so as to form a second connecting part in removable snap-fit engagement with said first connecting part.

7. The dog leash, according to claim 6,
wherein said first shell is comprised of a first positioning pin and a second positioning pin,
wherein said first positioning pin is located between said second leash opening and said third leash opening,
wherein said second positioning pin is eccentrically set from said first positioning pin so as to form a steel ring accommodation cavity between said first positioning pin and said second positioning pin, and
wherein said second shell is comprised of a first positioning hole and a second positioning hole, said first positioning pin being insertable in said first positioning hole, said second positioning pin being insertable in said second positioning hole.

* * * * *